United States Patent [19]

Perrot et al.

[11] Patent Number: 4,710,535
[45] Date of Patent: Dec. 1, 1987

[54] MASTERBATCHES FOR DELUSTRING POLYAMIDES

[75] Inventors: Pierre Perrot, Charbonnieres-les-Bains; Georges Vuillemey, Toussieu Mions, both of France

[73] Assignee: Rhone-Poulenc Fibres, Lyons, France

[21] Appl. No.: 871,827

[22] Filed: Jun. 9, 1986

[30] Foreign Application Priority Data

Jun. 13, 1985 [FR] France ................................ 85 09122

[51] Int. Cl.$^4$ ............................ C08K 3/22; C08K 9/04
[52] U.S. Cl. ...................................... 524/413; 523/351
[58] Field of Search ................ 523/351; 524/413, 267; 106/300

[56] References Cited

U.S. PATENT DOCUMENTS

| | | | |
|---|---|---|---|
| 2,689,839 | 9/1954 | Heckert | 523/309 |
| 2,846,332 | 8/1958 | Nesty | 523/351 |
| 3,321,566 | 5/1967 | Whitman | 524/606 |
| 3,324,071 | 6/1967 | Skoog | 524/606 |
| 3,505,088 | 4/1970 | Luginsland et al. | 106/300 |
| 3,673,147 | 6/1972 | Bor | 524/606 |
| 4,344,799 | 8/1982 | Köhler et al. | 106/300 |
| 4,474,681 | 10/1984 | Belde et al. | 106/300 |

FOREIGN PATENT DOCUMENTS 46-415  7/1971  Japan .
959211  5/1964  United Kingdom .

Primary Examiner—Veronica P. Hoke
Attorney, Agent, or Firm—Stevens, Davis, Miller & Mosher

[57] ABSTRACT

The present invention relates to masterbatches for delustring processable polyamides.

They contain 50 to 90% of a copolyamide used as a binder and consisting of 30 to 100% of hexamethylene adipamide units and 0–70% of caproamide units and 10 to 50% by weight of anatase titanium dioxide coated with 0.01 to 1.5% of silica and 1 to 3% of alumina and treated with a polydimethylsiloxane oil present in a proportion of 0.2 to 10% by weight of $TiO_2$.

They are obtained by adding $TiO_2$ powder into the autoclave immediately after the pressure release stage, when the reaction mass is still at a high temperature and before vacuum is applied.

The masterbatches according to the invention may be introduced directly into the liquid stream of the polymer to be spun.

9 Claims, No Drawings

MASTERBATCHES FOR DELUSTRING POLYAMIDES

The present invention relates to masterbatches intended for delustring processable polyamides, especially spinnable polyamides.

Fabricated articles based on polyamides such as polycaprolactam or polyhexamethylene adipamide have a naturally shiny appearance which is frequently undesirable, and which is usually corrected by adding titanium oxide before the polyamides are fabricated.

In the case of textile applications, use is generally made of finely divided anatase titanium oxide in the form of an aqueous dispersion, at the desired concentration, which is introduced at a stage in the process where there is no danger that the particles of titanium oxide may reagglomerate, but where the molten mass is still relatively low in viscosity; consequently the entire polymer output contains the same concentration of titanium dioxide.

Now, modern industrial plants frequently consist of a continuous monomer polycondensation line feeding several spinning frames directly by means of pressurized pipework.

These various frames—or parts of frames—usually produce filaments of different gauges, draw ratios, crossectional shapes, and the like; it would be a major industrial advantage if they could also produce filaments of different lustres, and some of them containing, if appropriate, various additives such as antiyellowing protectors, optical brighteners, and others.

A customary delustring process in a continuous polycondensation line is described in U.S. Pat. No. 2,689,839: a 10% strength aqueous dispersion of titanium dioxide is continuously added during the preparation of polyhexamethylene adipamide, at a time when the molten mass is at a temperature of between 220° and 320° C., preferably between 250° and 300° C., and when the water content of the medium is between 5 and 20%.

However, this delustring process offers no flexibility: it makes it necessary to produce each grade in a "run" of sufficient duration and, consequently, in a fairly large quantity. Furthermore, the product obtained during the run changeover periods contains variable quantities of delustring agents and/or additives and cannot be sold as first quality, and this contributes an additional economic disadvantage to this process.

It has also been proposed to add pigments using masterbatches, but the problem is especially difficult to solve in the case of polyhexamethylene adipamide: in fact, when it is intended to add adjuvants to a molten polymer mass, it is preferable that the nature of the binder forming the masterbatch be the same as that of the molten polymer to which the masterbatch is added, for obvious reasons of homogeneity of the final polymer.

Now, according to the present state of knowledge, polyhexamethylene adipamide does not lend itself readily to such an addition process because a masterbatch which contains only polyhexamethylene adipamide as a binder has a great tendency, when allowed to remain at a high temperature before being added to the molten polymer which is to be modified, to form nonfusible and insoluble fractions known as "gels", which constitute major heterogeneities both in the final molten polymer and in the filaments produced, and which give rise to redhibitory disadvantages when the polymers are fabricated, especially when they are spun.

Masterbatches have now been found which make it possible to delustre polyhexamethylene adipamide immediately before fabrication, which can contain high proportions of titanium oxide, and which can be used particularly within the scope of the continuous polycondensation and spinning processes, with a high degree of fine dispersion of titanium dioxide in the binder, as well as in the fabricated articles produced.

The invention also relates to a process for preparing such masterbatches.

More particularly, the present invention relates to masterbatches intended for delustring processable polyamides containing:

50 to 90% by weight of a copolyamide consisting of hexamethylene adipamide and caproamide units in proportions of 30-100% of hexamethylene adipamide units, and 0-70% of caproamide units, respectively, and 10 to 50% by weight of anatase titanium dioxide coated with a mixture of silica and of alumina in a proportion of 0.01 to 1.5% of silica and 1 to 3% of alumina and treated with a polydimethylsiloxane oil present in a proportion of 0.2 to 10% relative to the weight of the coated titanium dioxide powder, the titanium dioxide having a mean particle size of 0.1 to 0.45 $\mu$m.

The titanium dioxide is preferably first coated with manganese in the form of an insoluble salt in a proportion of 0.1 to 0.3% by weight of manganese, based on the coated titanium dioxide.

The invention also relates to a process for the preparation of masterbatches based on copolyamide 66/6 and intended for delustring processable polyamides by carrying out the polycondensation in a stirred autoclave, the said process consisting in adding the titanium dioxide in powder form immediately after the stage of compression to atmospheric pressure, while the reaction mass is at a high temperature and before the vacuum application stage, the masterbatch being subsequently cast and granulated in a known manner.

The process for the preparation of masterbatches may, preferably, consist in: (a) charging into a stirred autoclave, at atmospheric pressure:

23 to 104 parts, as dry solid, of hexamethylenediamine adipate (generally referred to as nylon 66 salt) in an aqueous solution of approximately 50% strength, 0 to 54 parts, as dry solid, of caprolactam in an aqueous solution of approximately 60% strength, and 0 to 0.13 part of acetic acid, based on 100% purity, this composition being then heated so as to produce a monomer concentration of between 65 and 77%, (b) raising the pressure to a value of 16 to 19 bars gauge and distilling off water to a reaction mass temperature of between 240° and 270° C., (c) reducing pressure gradually to atmospheric pressure over a period of 60 to 90 minutes while the reaction mass is at a temperature of between 270° and 280° C., (d) then adding 10 to 50 parts of titanium dioxide powder coated and treated as described hereinafter, the addition period being from 5 to 30 minutes, (e) maintaining the temperature for a period of 10 to 40 minutes, (f) applying a vacuum of 50 to 400 torr, preferably from 100 to 200 torr, gradually over approximately 15 minutes, and (g) breaking the vacuum and casting and granulating the masterbatch in a known manner.

The invention also relates to polyamides modified with the masterbatches according to the present application.

The term polyamide is understood to mean essentially polyhexamethylene adipamide produced from hexamethylenediamine and adipic acid, usually in the form of the corresponding salt.

Nevertheless, according to the present invention it is also possible to use copolyamides consisting essentially of hexamethylene adipamide units and containing up to 20% of units derived from another polyamide produced, for example, by replacing adipic acid with another dicarboxylic acid, such as sebacic acid, dodecanedioic acid, or by replacing hexamethylenediamine with another diamine such as bis-para-aminocyclohexylmethane or from an amino acid compound such as 6-aminocaproic acid (or caprolactam), 11-aminoundecanoic acid, and the like.

These are highly crystalline polyamides of high molecular weight and melting point, which can be used for moulding, preferably for the manufacture of films and especially for textile filaments.

The masterbatches according to the present invention contain from 50 to 90%, and preferably 65 to 75%, by weight of a copolyamide derived from hexamethylene adipamide and caprolactam (referred to in the text as 66/6), this copolyamide being used as a binder for titanium dioxide.

The quantity of the two components of copolyamide 66/6 which is present may vary within wide proportions ranging from 30 to 100% of hexamethylene adipamide units and from 0 to 70% of caproamide units; preferably from 50 to 80% of hexamethylene adipamide units are used per 20 to 50% of caproamide units.

When used in the specified proportions, copolyamide 66/6 makes it possible both to coat titanium dioxide and to add the compound thus formed to the molten polymer easily, especially by virtue of its low melting point, and consequently to avoid the formation of gels which would introduce heterogeneities into the molten mass. Above a proportion of 70% of caproamide units in the masterbatch binder, appreciable undesirable changes begin to be seen in the final polymer and the processed articles; in particular, the crystallizability of the filaments produced is modified.

Nevertheless, although it is difficult to use a masterbatch containing 100% of hexamethylene adipamide units, because of the tendency to form gels in the final molten polymer, the limiting proportion of 100% of hexamethylene adipamide units in the masterbatch can be achieved, provided that the residence time of the masterbatch at a high temperature before it is added to the molten mass of the polyamide to be processed is restricted, and that a highly suitable grade of $TiO_2$ is used, especially a $TiO_2$ containing a proportion of polydimethylsiloxane oil which lies in the region of the higher fraction indicated.

In this case, the complete absence of caproamide units causes the $TiO_2$ to disperse in the masterbatch less readily, but, conversely, has the advantage of avoiding any presence of a foreign body in the final molten polymer.

The anatase titanium dioxide is present in the masterbatch in a proportion of 10 to 50%, preferably 25 to 35% by weight.

The surface of the titanium dioxide particles is coated with a mixture of 0.01 to 5% of silica and 1 to 3% of alumina, preferably 0.5 to 1% of silica and 1.4 to 2.5% of alumina, based on the weight of coated $TiO_2$.

It also contains a polydimethylsiloxane oil in a proportion of 0.4 to 10%, preferably from 1 to 5%, by weight based on the weight of coated $TiO_2$.

The indicated proportion of polydimethylsiloxane oil is that present in the powdered titanium dioxide, that is to say that which can be determined. However, polydimethylsiloxane oil may be partially eliminated during the preparation of the masterbatch, but in a proportion which does not exceed one half of the quantity added, and without being thereby detrimental to the quality of the masterbatch produced or of the polyamides delustred therewith.

The titanium dioxide preferably comprises a first layer of manganese in the form of an insoluble salt, in a proportion of 0.1 to 0.3% by weight of manganese based on the coated titanium dioxide.

To be capable of being used without difficulty in spinning, the titanium dioxide particles must have a mean size of between 0.15 and 0.45 $\mu$m, preferably from 0.25 to 0.35 $\mu$m, the stated value corresponding to the median of the size distribution, which is taken as a mean size.

Titanium dioxide coated in this way may be added in the masterbatch at a high concentration (to 50%), which was not feasible hitherto with aqueous dispersions of $TiO_2$. It also has the additional advantage of being readily dispersible both in copolyamide 66/6 and in the final polymer.

Below the minimum proportion of 10% of $TiO_2$, the masterbatches produced are of little economic and industrial interest, while above 50% they become highly viscous and heterogeneous, and hence unusable.

The size and the dispersibility of the $TiO_2$ in the final polymer are evaluated by means of the hotplate test, carried out as follows:

particles of the masterbatch are added to particles of $TiO_2$-free polyhexamethylene adipamide, in such quantity that the total concentration of $TiO_2$ is 1.7%, that is to say a conventional concentration for delustred textile polyamide filaments;

the whole is homogenized in a powder mixer, for example a V-shaped apparatus built by Moritz;

polyhexamethylene adipamide delustred in this way is extruded in a laboratory extruder (nondegassing) 30 mm in diameter, 450 mm in length, and is then cast as a rod and granulated. It contains 1.7% by weight of $TiO_2$;

one granule of this rod is melted between two microscope slides to give a small, 40 $\mu$m thick plaque, 32×22 mm in size, i.e. with an area of 7 cm$^2$; and the small plaque thus prepared is examined under the microscope and the number of titanium dioxide particles with a diameter of between 8 and 12 $\mu$m is counted.

For the masterbatches according to the present invention, the number of particles between 8 and 12 $\mu$m is less than 20, generally less than 15, and this bears witness to the quality of the polyamide delustred in this way, especially for spinning.

Above a value of 20, the polymers to be processed tend, when spun, to block the filter packs placed upstream of the spinnerettes and to produce breakages when the filaments are drawn.

The method for preparing the masterbatches according to the invention consists in operating in a stirred autoclave in which the copolyamide 66/6 is prepared (in the proportions indicated above) and adding the titanium dioxide at a precise and specific moment during the polycondensation cycle, namely after the decompression stage, while the reaction mass is still at a high temperature (for example at 270°–280° C.) and before the application of vacuum, the masterbatch being sub$equently cast and granulated in a known manner.

In the process according to the invention, the important point consists in adding the titanium dioxide into the autoclave directly in the form of powder, thus avoiding the preliminary preparation of an aqueous suspension and also avoiding a subsequent removal of water.

Another important point of the process is the moment of addition of the titanium dioxide, which has numerous advantages:

titanium dioxide is added at atmospheric pressure, which is much easier than under pressure or under vacuum, the addition is carried out at a stage when the reaction mass is low in viscosity, which facilitates dispersion in the medium, and at this moment of addition there is little water in the medium, and this facilities dispersion, because of the hydrophobic nature of titanium dioxide.

This process makes it possible, therefore, to produce masterbatches containing titanium dioxide which is perfectly dispersed and highly concentrated.

The masterbatch granulates may be introduced directly into the liquid stream of the polymer to be spun, for example by means of a melting vessel, a metering pump and an injection valve; a simple static mixer may be provided in the main stream of the molten polymer to mix the masterbatch with the molten polymer. Furthermore, the presence of caproamide units facilitates the coating of the $TiO_2$ particles and improves the thermal stability of the masterbatches.

Such addition may be carried out immediately after the polymer has been spun on an industrial frame which may comprise some tens of spinning stations, or only on a part of the frame; for example, the masterbatch may be added at only one spinning station.

The masterbatches according to the invention are mixed with the polyamide to be delustred in the desired proportions of titanium dioxide, which may vary depending on the desired degree of lustre in the final products, and which can differ according to whether textile filaments, films or moulded products are involved.

The delustred polymer, and the articles produced, contain a small number of caproamide units, which do not appreciably affect the products processed in this manner.

In the case of textile filaments, the degrees of delustring generally vary between 0.02% and 1.7% by weight of titanium dioxide relative to the final polymer.

In addition to the titanium dioxide, it is also possible to add to the masterbatch other adjuvants capable of improving or modifying certain properties such as dye affinity, heat or light stability, antistatic properties, and the like.

Furthermore, it is obvious that the polyamide to be delustred may also contain conventional adjuvants which make it possible to improve certain characteristics such as dyeing properties, heat or light stability, especially in the case where the titanium dioxide used is free from manganese.

The following examples, in which the parts are to be understood as being by weight, are given by way of indication to illustrate the invention, without implying any limitation.

EXAMPLE 1

The following are charged into a stirred 200-liter autoclave capable of operating under vacuum and under pressure:

32.5 kg of dry nylon 66 salt in 50% strength aqueous solution, 42 kg of dry caprolactam in 60% strength aqueous solution, and 270 g of 55% strength acetic acid.

This aqueous solution is concentrated to 77% strength at atmospheric pressure and then the apparatus is closed and heated to about 220° C.; water is distilled off under a gauge pressure of 17.5 bars up to 260° C.

Pressure is released over 90 minutes to atmospheric pressure at a temperature of 285° C.

A screw conveyor for powdered products is then used to introduce into the autoclave, over 30 minutes, 30 kg of anatase titanium dioxide coated with a mixture of silica and alumina in a proportion of 0.7% of silica and 1.4% of alumina and treated with a polydimethylsiloxane oil with a molecular weight $\overline{M}n$ of approximately 15,000 in a proportion of 0.5% relative to the total weight of treated $TiO_2$.

Atmospheric pressure is maintained, with stirring, for 20 minutes and then a vacuum of 150 torr is applied over 15 minutes.

The vacuum is then broken, and then the copolyamide 66/6 thus delustred is cast as a ribbon and granulated.

Approximately 85 kg of masterbatch are obtained in the form of pellets, consisting of: 70% of copolyamide used as a binder and containing 40% of hexamethylene adipamide units and 60% of caproamide units, and 30% by weight of anatase $TiO_2$ coated with a mixture of silica and alumina in a proportion of 0.7% of silica and 1.4% of alumina and containing 0.5% of polydimethylsiloxane.

The mean particle size of the coated titanium dioxide is of the order of 0.35 μm.

A determination on the masterbatch shows the presence of 0.5% of polydimethylsiloxane, based on the weight of $TiO_2$.

The masterbatch in the form of pellets is melted again at 280° C. in a melting vessel of conventional type and is injected using a gear pump, in a proportion of 1% of masterbatch, into the principal stream of molten nylon 66 containing 7 ppm of manganese, immediately before spinning, the mixing being produced by means of a known static mixer placed downstream of the injection point.

Spinning is carried out in a conventional manner, without blocking the filter packs placed upstream of the spinnerettes.

The filaments are drawn and textured in a conventional manner without difficulty and have a $TiO_2$ content of 0.3% and an overall denier of 22 dtex per 7 filaments (linear density 3.3 dtex).

Furthermore, the quality of dispersion of $TiO_2$ is monitored using the method indicated in the description on page 10, by mixing the masterbatch in the form of pellets with granules of undelustred nylon 66, in such quantity that the total concentration of $TiO_2$ is 1.7%: the number of $TiO_2$ particles with a diameter of between 8 and 12 μm is 16.

For comparison, the same operation as that carried out above is performed but, after the vacuum has been broken (that is to say practically at the end of the operation), the TiO$_2$ is added as a powder: the TiO$_2$ powder remains on the surface of the copolyamide and does not mix with the molten mass at all, yielding a completely heterogeneous mixture.

EXAMPLE 2

The following are charged into a stirred 500-liter autoclave capable of operating under vacuum and under pressure:

177.5 kg of dry nylon 66 salt in 50% strength aqueous solution, 51 kg of dry caprolactam in 60% strength aqueous solution, and 615 g of 55% strength acetic acid.

This aqueous solution is concentrated to 77% strength at atmospheric pressure, and then the apparatus is closed and is heated to approximately 220° C.; water is distilled off under a gauge pressure of 17.5 bars up to 260° C.

Pressure is released over 90 minutes to atmospheric pressure at a temperature of 285° C.

A screw conveyor for powdered products is then used to add to the autoclave, over 30 minutes, 87.5 kg of anatase titanium dioxide coated with manganese in a proportion of 0.2% by weight and with a mixture of silica and alumina in a proportion of 1% of silica and 2% of alumina, and treated with 4% of polydimethylsiloxane oil.

Atmospheric pressure is maintained, with stirring, for 50 minutes and then a vacuum of 150 torr is applied over 15 minutes.

The vacuum is then broken, and then the copolyamide 66/6 thus delustred is cast as a ribbon and is granulated.

Approximately 280 kg of masterbatch are obtained in the form of pellets, consisting of:

70% of copolyamide serving as a binder and containing

75% of hexamethylene adipamide units and

25% of caproamide units, and

30% by weight of coated anatase TiO$_2$ whose mean particle size is of the order of 0.35 μm.

The masterbatch in the form of pellets is melted again at 280° C. in a melting vessel of conventional type and is injected by means of a gear pump, in a proportion of 1% of masterbatch, into the main stream of molten nylon 66 containing 7 ppm of manganese, immediately before spinning, the mixing being produced by means of a known static mixer placed downstream of the injection point.

The spinning is carried out in conventional manner, without blocking of the filter packs placed upstream of the spinnerettes.

The filaments are drawn and textured without difficulty in conventional manner and have a TiO$_2$ content of 0.3% and an overall denier of 22 dtex per 7 filaments (linear density 3.3 dtex).

Furthermore, the quality of dispersion of TiO$_2$ is monitored using the method indicated in the description on page 10, by mixing the masterbatch in pellet form with granules of undelustred nylon 66, in such quantity as to give a total TiO$_2$ concentration of 1.7%: the number of particles of TiO$_2$ with a diameter of between 8 and 12 μm is from 18 to 20.

EXAMPLE 3

The following are charged into a stirred 7.5-liter autoclave capable of operating under vacuum and under pressure:

1,048 g of dry nylon 66 salt in approximately 50% strength aqueous solution, 1,356 g of dry caprolactam, and 4.8 g of pure acetic acid.

The polycondensation of the copolyamide is carried out as shown in Example 1 and, at the end of the pressure release, a screw conveyor is used as in Example 1 to add 968 g of a titanium dioxide coated with 0.25% by weight of manganese, 0.8% of silica and 2.25% of alumina, the titanium dioxide not having been treated with any polydimethylsiloxane.

Approximately 2.5 kg of masterbatch are obtained, with a TiO$_2$ content of 30% (whose mean particle size is 0.35 μm) and the size and the dispersibility of the TiO$_2$ are measured as indicated on page 10; 350 particles of TiO$_2$ of between 8 and 12 μm are counted.

It is clear, therefore, that such a titanium dioxide untreated with polydimethylsiloxane is unsuitable for the preparation of the masterbatches according to the invention.

EXAMPLE 4

The following are charged into a stirred 7.5-liter autoclave capable of operating under vacuum and under pressure:

1,048 g of dry nylon 66 salt in approximately 50% strength aqueous solution, 1,356 g of dry caprolactam, and 4.8 g of pure acetic acid.

The polycondensation of the copolyamide is carried out as indicated in Example 1 and at the end of the pressure release a screw conveyor is used to add 968 g of an anatase TiO$_2$ dioxide coated with manganese in a proportion of 0.2% by weight, with 1% of silica and 2% of alumina, and then treated with 4% of polydimethylsiloxane oil.

2,350 g of masterbatch are obtained, containing 30% of TiO$_2$ (whose mean particle size is 0.35 μm) containing 2.1% of polydimethylsiloxane oil by weight, based on titanium dioxide.

Number of 8–12 μm particles: 14 according to the hotplate test.

EXAMPLE 5

Preparation of a masterbatch containing 10% of titanium dioxide:

The following are introduced into a compounding extruder known commercially under the trade name Diskpack (built by Farrel) with a diameter of 150 mm and whose body is maintained at a temperature of 275° to 280° C., and whose throughput is 32 kg/hour:

undelustred nylon 66 prepared separately in a conventional manner, and anatase TiO$_2$ whose mean particle size is 0.33 μm: coated with 1% of silica and 2% of alumina, and treated with 0.5% of polydimethylsiloxane in such proportion that the masterbatch produced contains a 10% concentration of TiO$_2$.

The quantity of polydimethylsiloxane present in the TiO$_2$ powder is also found in the masterbatch.

The hotplate test shows the number of particles between 8 and 12 μm to be 20.

The limiting result obtained in this example is due to the fact that the masterbatch contains pure nylon 66 and that the polydimethylsiloxane content is only 0.5%, despite a $TiO_2$ concentration of only 10% and despite the efficient compounding produced by the Farrel unit.

EXAMPLE 6

The following are mixed in a Moritz V-mixer for powder:

3.5 kg of copolyamide 66/6 in a proportion of 40/60 by weight, and 1.5 kg of a $TiO_2$ powder coated with:
0.2% by weight of manganese
1% of silica, and
2% of alumina and then treated with 4% of polydimethylsiloxane oil, whose mean particle size is 0.35 μm.

This titanium oxide is the same as that used in Example 4.

The mixture is then introduced into a type ZSK 30 compounding extruder built by Werner und Pfleiderer, the body of which is maintained at a temperature of between 275° and 280° C.

The masterbatch containing 30% $TiO_2$ is extruded in the form of rods and is then granulated.

The number of particles of a size of between 8 and 12 μm in the masterbatch obtained is measured using the hotplate test: it is 10.

2.56% by weight of polydimethylsiloxane, based on the weight of $TiO_2$, are found again in the masterbatch.

What is claimed is:

1. Masterbatches intended for delustring processible polyamides by addition of at least a portion of the masterbatch to the polyamide prior to shaping thereof, wherein the masterbatch comprises 50 to 90% by weight of a polyamide selected from the group consisting of homopolyamides and copolyamides used as a binder, consisting of 30 to 100% of hexamethylene adipamide units and 0 to 70% of caproamide units, 10 to 50% by weight of anatase titanium dioxide first coated with a mixture of silica and of alumina in a proportion of 0.01 to 1.5% of silica and 1 to 3% of alumina and then contacted with a polydimethylsiloxane oil present in a proportion of 0.2 to 10% relative to the weight of the coated titanium dioxide powder, the mean particle size of the titanium dioxide in the masterbatch being between 0.15 to 0.45 μm.

2. Masterbatches according to claim 1, characterized in that they contain:
   65 to 75% of the polyamide used as a binder, and
   25 to 35% of coated titanium dioxide.

3. Masterbatches according to claim 1, characterized in that the titanium dioxide is coated with a mixture of silica and of alumina in a proportion of 0.5 to 1% and 1.4 to 2.5% respectively, based on the weight of titanium dioxide.

4. Masterbatches according to claim 1, characterized in that the polydimethylsiloxane oil is deposited in a proportion of 0.4 to 5% by weight based on the $TiO_2$ powder.

5. Masterbatches according to claim 1, characterized in that the mean particle size of the coated titanium dioxide is between 0.25 and 0.35 μm.

6. Masterbatches according to claim 1, characterized in that the titanium dioxide includes a first layer of manganese in the form of an insoluble salt in a proportion of 0.1 to 0.3% by weight of manganese relative to the coated titanium dioxide.

7. Process for the preparation of masterbatches based on polyamides which are intended for delustering processable polyamides by polycondensation in a stirred autoclave wherein the masterbatch comprises 50 to 90% by weight of a polyamide selected from the group consisting of homopolyamides and copolyamides used as a binders, consisting of 30 to 100% of hexamethylene adipamide units and 0 to 70% of caproamide units, 10 to 50% by weight of anatase titanium dioxide first coated with a mixture of silica and of alumina in a proportion of 0.01 to 1.5% of silica and 1 to 3% of alumina and then contacted with a polydimethylsiloxane oil present in a proportion of 0.2 to 10% relative to the weight of the coated titanium dioxide powder, the mean particle size of the titanium dioxide in the masterbatch being between 0.15 to 0.45 μm, characterized in that titanium dioxide is added to the masterbatch in powder form immediately after the stage of pressure reduction to atmospheric pressure while the reaction mass is at a high temperature and before the stage to applying vacuum, the masterbatch being subsequently cast and granulated.

8. Process for the preparation of a masterbatch according to claim 7, characterized in that:

(a) the following are charged into a stirred autoclave:
      23 to 104 parts by weight, counted as dry solid, of hexamethylenediamine adipate in approximately 50% strength aqueous solution,
      0 to 54 parts by weight, counted as dry solid, of caprolactam as an approximately 60% aqueous solution, and
      0 to 0.13 part by weight of acetic acid, counted as pure material, and this solution is heated until a monomer concentration of between 65 and 77% is obtained;

(b) the pressure in the autoclave is increased to a gauge pressure of 16 to 19 bars and water is distilled off up to a reaction mass temperature of between 240° and 270° C.;

(c) pressure is gradually reduced to atmospheric pressure during a period of between 60 and 90 minutes, while the reaction mass is at a temperature of between 270° and 280° C.;

(d) the coated and treated titanium dioxide powder is then added in a proportion of 10 to 50 parts by weight, the addition period being between 5 and 30 minutes;

(e) the reaction mass is maintained at a temperature of 270° to 280° C. for approximately 30 minutes, and (f) a vacuum of between 50 and 400 torr is gradually applied over approximately 15 minutes and then the vacuum is broken and the masterbatch is cast and granulated.

9. Fabricated articles from the group consisting of filaments, films, and sheets, based on polyamide and delustred by means of masterbatches according to claim 1.

* * * * *